US012674044B2

(12) United States Patent
Lee et al.

(10) Patent No.: US 12,674,044 B2
(45) Date of Patent: Jul. 7, 2026

(54) MULTILAYER FLOOR DECORATIVE MATERIAL

(71) Applicant: KCC Glass Corporation, Seoul (KR)

(72) Inventors: Deuk Soo Lee, Chungcheongnam-do (KR); Sang Hyun Lee, Chungcheongnam-do (KR); Byeong Ro Jung, Chungcheongbuk-do (KR); Jang Wook Kim, Gyeonggi-do (KR)

(73) Assignee: KCC Glass Corporation, Seoul (KR)

( * ) Notice: Subject to any disclaimer, the term of this patent is extended or adjusted under 35 U.S.C. 154(b) by 760 days.

(21) Appl. No.: 17/922,614

(22) PCT Filed: May 4, 2021

(86) PCT No.: PCT/KR2021/005584
§ 371 (c)(1),
(2) Date: Nov. 1, 2022

(87) PCT Pub. No.: WO2021/225350
PCT Pub. Date: Nov. 11, 2021

(65) Prior Publication Data
US 2023/0167275 A1      Jun. 1, 2023

(30) Foreign Application Priority Data

May 8, 2020      (KR) ........................ 10-2020-0055228

(51) Int. Cl.
*C08K 13/02*      (2006.01)
*B32B 5/02*      (2006.01)
(Continued)

(52) U.S. Cl.
CPC ................ *C08K 13/02* (2013.01); *B32B 5/02* (2013.01); *B32B 5/20* (2013.01); *B32B 5/245* (2013.01);
(Continued)

(58) Field of Classification Search
CPC ...... C08J 2427/06; C08J 2327/06; C08J 9/30; C08J 9/0066–008; C08K 2201/003;
(Continued)

(56) References Cited

U.S. PATENT DOCUMENTS 2,446,976 A * 8/1948 Cousins ................. C08K 5/098
524/400
5,278,198 A 1/1994 Grohman
(Continued)

FOREIGN PATENT DOCUMENTS

CN      104179068 A * 12/2014
CN      104479253 A * 4/2015 ............. C08L 27/06
(Continued)

OTHER PUBLICATIONS

Derwent abstract of KR 2003018670. (Year: 2003).*
(Continued)

*Primary Examiner* — Christina H. W. Rosebach
(74) *Attorney, Agent, or Firm* — Morgan, Lewis & Bockius LLP

(57)      ABSTRACT

The present invention relates to a multilayer floor decorative material comprising a foam layer, wherein the foam layer comprises a polyvinyl chloride resin, a plasticizer, a filler, a heat stabilizer and a foam stabilizer, the foam layer is formed by a mechanical foaming method, the heat stabilizer comprises barium stearate and zinc stearate, and the foam stabilizer is included in an amount of 1 to 10 parts by weight on the basis of 35 to 55 parts by weight of the polyvinyl chloride resin.

19 Claims, 1 Drawing Sheet

(51) Int. Cl.

| | |
|---|---|
| *B32B 5/20* | (2006.01) |
| *B32B 5/24* | (2006.01) |
| *B32B 27/20* | (2006.01) |
| *B32B 27/22* | (2006.01) |
| *B32B 27/30* | (2006.01) |
| *C08J 9/00* | (2006.01) |
| *C08J 9/30* | (2006.01) |
| *C08K 3/26* | (2006.01) |
| *C08K 5/098* | (2006.01) |
| *C08K 5/12* | (2006.01) |

(52) U.S. Cl.
CPC .............. *B32B 27/20* (2013.01); *B32B 27/22* (2013.01); *B32B 27/304* (2013.01); *C08J 9/0023* (2013.01); *C08J 9/0066* (2013.01); *C08J 9/30* (2013.01); *B32B 2262/101* (2013.01); *B32B 2266/0235* (2013.01); *B32B 2307/732* (2013.01); *B32B 2471/00* (2013.01); *C08J 2327/06* (2013.01); *C08K 2003/265* (2013.01); *C08K 5/098* (2013.01); *C08K 5/12* (2013.01)

(58) Field of Classification Search
CPC .. C08K 13/02; B32B 5/02; B32B 5/20; B32B 5/245
See application file for complete search history.

(56) References Cited

U.S. PATENT DOCUMENTS

| | | | |
|---|---|---|---|
| 5,324,461 | A | 6/1994 | Grohman |
| 5,391,585 | A | 2/1995 | Grohman |
| 2006/0048464 | A1 | 3/2006 | Suzuki et al. |

FOREIGN PATENT DOCUMENTS

| | | | |
|---|---|---|---|
| JP | 04236246 | * | 8/1992 |
| JP | 2007-321117 | A | 12/2007 |
| JP | 2018-123494 | A | 8/2018 |
| JP | WO2017/145976 | A1 | 12/2018 |
| KR | 10-2005-0057322 | A | 6/2005 |
| KR | 10-2009-0095824 | A | 9/2009 |
| KR | 10-2014-0057157 | A | 5/2014 |
| KR | 10-2018-0117359 | A | 10/2018 |

OTHER PUBLICATIONS

Machine Translation of MY 139782 by Tiang et al. (Year: 2009).*
Machine Translation of KR 20030018670 by Lee et al.(Year: 2003).*
Machine translation of CN 104179068 by Liu (Year: 2014).*
Machine translation of JP H04236246 by Takiguchi. (Year: 1992).*
Machine Translation of CN 104479253 by Liu. (Year: 2015).*
International Search Report issued in corresponding International Patent Application No. PCT/KR2021/005584 dated Aug. 13, 2021.

* cited by examiner

<u>10</u>
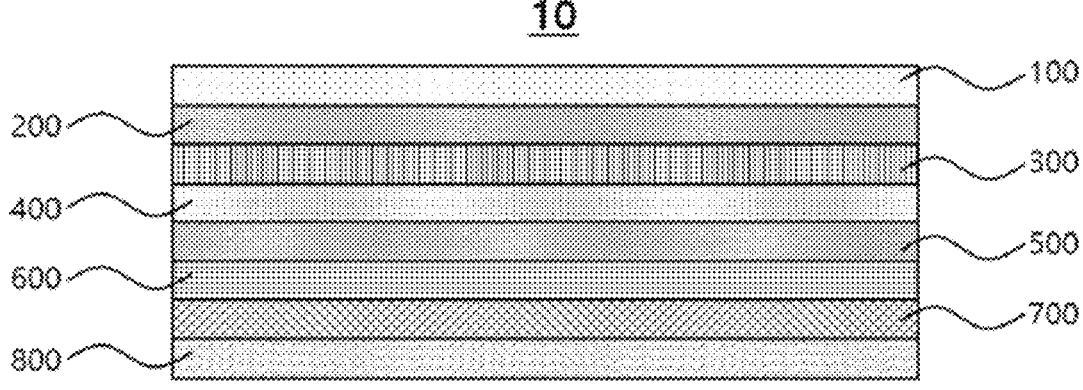

MULTILAYER FLOOR DECORATIVE MATERIAL

TECHNICAL FIELD

The present invention relates to a multilayer floor decorative material that has excellent impact absorption rate, does not contain regulated phthalates, and is eco-friendly due to low emission of volatile organic compounds (VOCs).

BACKGROUND ART

Recently, among important catch phrases applied to each industry, eco-friendliness has been materialized in the form of actively restricting the use of volatile organic compounds (VOCs). In addition, as part of the restrictions, sanctions for products containing the volatile organic compounds have been added.

The volatile organic compounds have a property of volatilizing easily at room temperature, and generate photochemical oxidizing agents such as ozone through a photochemical reaction with nitrogen oxides (NOx) in the atmosphere when present in a gaseous state to cause photochemical smog. In addition, it has been known that materials such as benzene are very harmful to the human body as carcinogens, and most VOCs, including styrenic compounds, cause bad odors.

Meanwhile, in order to improve walking feeling and prevent noise generation, a conventional floor decorative material including a foam layer generally includes a foam layer foamed using a foaming agent. However, azodicarbonamide (ADCA), which is a typical foaming agent, has a problem of generating formamide, a volatile organic compound, while foaming.

As an alternative thereto, the Korean Patent Publication No. 2005-0057322 (Patent Document 1) discloses a floor tile for a rug in which an anti-slip backing material obtained by solidifying a paste sol containing a polyvinyl chloride-based resin and a plasticizer is provided on the back surface thereof. However, the floor tile of Patent Document 1 includes a phthalic acid-based plasticizer as a plasticizer, and the phthalic acid-based plasticizer emits harmful materials such as environmental hormones and toxic gas (hydrogen chloride), and as a result, there was a problem of high toxicity to the human body.

Therefore, there is a need for research and development on a multilayer floor decorative material which has a small thickness variation between tile pieces and excellent impact absorption rate, and is eco-friendly due to less emission of volatile organic compounds (VOCs).

DISCLOSURE

Technical Problem

Therefore, an object of the present invention is to provide a multilayer floor decorative material which has a small thickness variation between tile pieces and excellent impact absorption rate, and is eco-friendly due to less emission of volatile organic compounds (VOCs).

Technical Solution

An aspect of the present invention provides a multilayer floor decorative material comprising a foam layer, wherein the foam layer comprises a polyvinyl chloride resin, a plasticizer, a filler, a heat-resistant stabilizer and a foam stabilizer, the foam layer is formed by a mechanical foaming method, the heat-resistant stabilizer comprises barium stearate and zinc stearate, and the foam stabilizer is included in an amount of 1 to 10 parts by weight based on 35 to 55 parts by weight of the polyvinyl chloride resin.

Advantageous Effects

According to the present invention, a multilayer floor decorative material is prepared by a mechanical foaming method without using a foaming agent, so that there is a small difference in thickness between tile pieces. In addition, the multilayer floor decorative material has an excellent impact absorption rate, does not include regulated phthalates, and is eco-friendly due to little emission of volatile organic compounds (VOCs).

DESCRIPTION OF DRAWINGS

FIG. 1 is a cross-sectional view of a multilayer floor decorative material according to an exemplary embodiment of the present invention.

BEST MODE

Hereinafter, the present invention will be described in detail.

Throughout the specification, a case where a part "comprises" an element will be understood to imply the inclusion of stated elements but not the exclusion of any other elements unless explicitly described to the contrary.

In addition, in the specification, it will be understood that when a certain layer is located "on" the other layer, the certain layer is not only in contact with the other layer, but also has another layer between both layers.

Multilayer Floor Decorative Material

A multilayer floor decorative material according to the present invention includes a foam layer.

Foam Layer

The foam layer serves to provide cushioning property to the floor decorative material to improve an impact absorption rate and an amount of light impact sound reduction.

The foam layer includes a polyvinyl chloride resin, a plasticizer, a filler, a heat-resistant stabilizer and a foam stabilizer.

<Polyvinyl Chloride Resin>

The polyvinyl chloride resin is a main resin of the foam layer.

The polyvinyl chloride resin may have a polymerization degree of 1,000 to 2,000, 1,100 to 1,900, or 1,200 to 1,800. When the polymerization degree of the polyvinyl chloride resin is less than the above range, there may be a problem that the strength and elasticity of the prepared floor decorative material are insufficient due to the low binding strength of the composition, so that the mechanical properties, the impact absorption rate, and the amount of light impact sound reduction are reduced. When the polymerization degree exceeds the above range, there may be a problem that the binding strength of the composition is excessively high, so that workability and processability are insufficient.

In addition, the polyvinyl chloride resin may have a weight average molecular weight (Mw) of 130,000 to 250, 000 g/mol. For example, the resin may have a weight average molecular weight of 140,000 to 240,000 g/mol, or 150,000 to 230,000 g/mol. When the weight average molecular weight of the polyvinyl chloride resin is less than the above range, there may be a problem that the viscosity of the composition is low and the elasticity is insufficient, so that the non-slip property is insufficient. When the weight average molecular weight exceeds the above range, the viscosity of the composition is high and the elasticity is lowered, so that workability and appearance may be deteriorated.

The polyvinyl chloride resin may be included in the composition in an amount of 35 to 55 parts by weight, or 40 to 50 parts by weight with respect to 30 to 50 parts by weight of the plasticizer. When the content of the polyvinyl chloride resin is less than the above range, the viscosity of the composition is low and the mechanical properties of the prepared floor decorative material are lowered. When the content exceeds the above range, there may be a problem that the viscosity of the composition becomes excessively high, so that the appearance and workability of the prepared floor decorative material are deteriorated. The content of the polyvinyl chloride resin may be based on 100 parts by weight of the composition.

<Plasticizer>

The plasticizer serves to impart flexibility to the foam layer and increase processability.

The foam layer does not include regulated phthalates as the plasticizer, and as a result, the composition has excellent environmental friendliness. For example, the regulated phthalates may be included in an amount of less than 0.1 wt % with respect to the total weight of the foam layer. In this case, the "regulated phthalates" refer to phthalate-based materials classified as regulated materials according to a RoHS guideline and the like.

The regulated phthalates may include, for example, di-2-ethylhexyl phthalate (DEHP), di-isononyl phthalate (DINP), butyl benzyl phthalate (BBP), di-isodecyl phthalate (DIDP), di-n-octyl phthalate (DNOP), di-butyl phthalate (DBP), and the like.

In addition, the plasticizer may include a plasticizer other than the regulated phthalates, and may include one or more selected from the group consisting of, for example, dioctyl terephthalate (DOTP), 1,2-cyclohexane dicarboxylic acid diisononyl ester (DINCH) and dipropylheptylphthalate (DPHP).

The plasticizer may be included in the composition in an amount of 30 to 50 parts by weight, or 35 to 45 parts by weight with respect to 35 to 55 parts by weight of the polyvinyl chloride resin. When the content of the plasticizer is less than the above range, there may be a problem that the viscosity of the composition is high, so that processability is lowered, and when the content exceeds the above range, there may be a problem that the hardness of the prepared floor decorative material is lowered due to an excess of plasticizer. The content of the plasticizer may be based on 100 parts by weight of the composition.

<Filler>

The filler serves to impart a sense of weight to the floor decorative material and to increase the workability of the foam layer.

The filler may include one or more selected from the group consisting of calcium carbonate, titanium dioxide, alumina, aluminum oxide and silica.

In addition, the filler may have an average diameter of 1 to 50 μm, or 5 to 20 μm. When the average diameter of the filler is less than the above range, there may be a problem that the viscosity of the composition is increased, so that the workability is lowered, and when the average diameter exceeds the above range, there may be a problem that the mechanical properties of the prepared floor decorative material are lowered.

The filler may be included in the foam layer in an amount of 1 to 20 parts by weight, or 5 to 15 parts by weight with respect to 35 to 55 parts by weight of the polyvinyl chloride resin. When the content of the filler is less than the above range, there may be a problem that an effect by the filler is insufficient, so that that economic feasibility is lowered and processability is deteriorated, and when the content exceeds the above range, there may be a problem that the elasticity of the prepared floor decorative material is lowered so that mechanical properties are insufficient. The content of the filler may be based on 100 parts by weight of the composition.

<Heat-Resistant Stabilizer>

The heat-resistant stabilizer serves to improve the heat resistance of the foam layer to prevent pores from being broken.

The heat-resistant stabilizer includes barium stearate and zinc stearate. When the heat-resistant stabilizer includes barium stearate and zinc stearate, the heat-resistant stabilizer has an effect of improving the cushioning property of the prepared floor decorative material by increasing the heat resistance of the foam layer to prevent carbonization and discoloration during mechanical foaming and prevent pores from being broken by heat.

In addition, the heat-resistant stabilizer may include barium stearate and zinc stearate at a weight ratio of 1:1 to 3, for example, 1:1.5 to 2.5. When the weight ratio of zinc stearate/barium stearate is less than 1, the processability of the PVC resin is lowered to reduce the cushioning property, the impact absorption rate and the amount of light impact sound reduction of the prepared floor decorative material. When the weight ratio thereof exceeds 3, the heat resistance of the foam layer is lowered so that carbonization occurs, or raw materials adhere to the surface of molding equipment, thereby making it difficult to knead the composition, so that the cushioning property, the impact absorption rate and the mechanical properties of the floor decorative material may be lowered.

In addition, the heat-resistant stabilizer may be included in the foam layer in an amount of 0.5 to 7 parts by weight, or 1 to 5 parts by weight with respect to 35 to 55 parts by weight of the polyvinyl chloride resin. When the content of the heat-resistant stabilizer is less than the above range, there may be a problem that an effect of improving the heat resistance of the floor decorative material is insufficient as an effect due to the addition of the heat-resistant stabilizer, and when the content thereof exceeds the above range, there may be a problem that the processability of the composition is lowered and the interlayer adhesion is lowered, so that mechanical properties are lowered. The content of the heat-resistant stabilizer may be based on 100 parts by weight of the composition.

<Foam Stabilizer>

The foam stabilizer serves to impart moisture-proof properties to the foam layer and prevent the pores from being broken during foaming.

The foam stabilizer is not particularly limited as long as the foam stabilizer can be generally used in the foam layer. For example, the foam stabilizer may be silicones, and include BYK 8070 and BYK 8020 manufactured by Byk Chemie, SYNTHAMID 218 by Th. Boehme GmbH, etc., as commercially available products.

In addition, the foam stabilizer may be included in the foam layer in an amount of 1 to 10 parts by weight, or 2 to 7 parts by weight with respect to 35 to 55 parts by weight of the polyvinyl chloride resin. When the content of the foam stabilizer is less than the above range, there may be a problem that it is not easy to form pores so that the pores in the foam layer are insufficient, and the cushioning property of the prepared floor decorative material is insufficient, so that the impact absorption rate, the amount of light impact sound reduction, and the like are insufficient. When the content exceeds the above range, there may be a problem that the processability and interlayer adhesion of the composition are lowered, so that mechanical properties and lower productivity are deteriorated. The content of the foam stabilizer may be based on 100 parts by weight of the composition.

The foam layer may be foamed by a mechanical method. In this case, the mechanical foaming method may be performed, for example, by stirring while injecting air into the foam layer composition to form pores. Specifically, the foam layer is foamed by a mechanical foaming method, not a chemical foaming method, so that the thickness can be uniformly adjusted after foaming, and is eco-friendly without volatile organic compounds (VOCs) generated from a chemical foaming agent.

In addition, the foam layer may have a foaming magnitude of 150 to 350%, or 200 to 300%. When the foaming magnitude of the foam layer is less than the above range, there may be a problem that the pores in the foaming layer are insufficient, so that physical properties such as the impact absorption rate and the amount of light impact sound reduction of the floor decorative material are insufficient. When the foaming magnitude thereof exceeds the above range, there may be a problem that the pores in the foam layer are excessively increased, so that the mechanical strength of the floor decorative material is poor. At this time, the foaming magnitude of 200% means that, if the density of the composition before stirring was 1 g/cm$^3$, the density of the composition becomes 0.5 g/cm$^3$ to be decreased two times after stirring while injecting air to the composition.

In addition, the foam layer may have an average thickness of 0.5 to 2.0 mm, or 0.7 to 1.5 mm. When the average thickness of the foam layer is less than the above range, there may be a problem that the cushioning property and the impact absorption rate of the floor decorative material are reduced due to the small thickness of the foam layer, and when the average thickness thereof exceeds the above range, the thickness of the foam layer of the prepared floor decorative material may be increased, so that the mechanical strength of the floor decorative material may be deteriorated.

The multilayer floor decorative material of the present invention may include a form in which a balance layer, a first middle layer, a glass fiber layer, a foam layer, a second middle layer, a printing layer, a transparent layer and a surface treatment layer are sequentially stacked, or a form in which the balance layer, the first middle layer, the foam layer, the glass fiber layer, the second middle layer, the printing layer, the transparent layer and the surface treatment layer are sequentially stacked.

Referring to FIG. 1, a multilayer floor decorative material 10 according to the present invention may include a form in which a balance layer 800, a first middle layer 700, a glass fiber layer 600, a foam layer 500, a second middle layer 400, a printing layer 300, a transparent layer 200 and a surface treatment layer 100 are sequentially stacked.

Balance Layer

The balance layer is seated on a bottom surface and serves to provide an anti-curling function to the floor decorative material.

The balance layer is not particularly limited as long as the balance layer is a balance layer that can be used for a conventional floor decorative material, and may include, for example, a polyethylene resin, a polypropylene resin, an acrylonitrile butadiene styrene (ABS) resin, a polyvinyl chloride resin, an acrylic resin, a polyester resin, a polystyrene resin, polytetrafluoroethylene, an ethylene vinyl acetate copolymer, an ethylene propylene copolymer, and the like.

In addition, the balance layer may have an average thickness of 0.1 to 1.5 mm, or 0.2 to 1.2 mm. When the average thickness of the balance layer is less than the above range, there may be a problem that the thickness of the balance layer is thin, so that the curling prevention and noise prevention effects of the floor decorative material are insufficient. When the average thickness thereof exceeds the above range, there may be a problem that the thickness of the balance layer is too thick, so that economic feasibility is lowered and appearance and workability are deteriorated.

First Middle Layer

The first middle layer serves to provide a noise prevention function, dimensional stability, and a curling prevention function to the floor decorative material.

The first middle layer is not particularly limited as long as the first middle layer is a middle layer that can be used for a conventional floor decorative material, and may include, for example, a polyethylene resin, a polypropylene resin, an ABS resin, a polyvinyl chloride resin, an acrylic resin, a polyester resin, a polystyrene resin, polytetrafluoroethylene, an ethylene vinyl acetate copolymer, an ethylene propylene copolymer, and the like.

In addition, the first middle layer may have an average thickness of 1 to 5 mm, or 2 to 4 mm. When the total thickness of the first middle layer is less than the above range, there may be a problem that noise prevention, dimensional stability and mechanical properties of the prepared flooring decorative material are deteriorated. When the total thickness thereof exceeds the above range, there may be a problem that the weight of the prepared floor material becomes heavy so that economical efficiency is deteriorated, and the thickness of the floor material becomes excessively thick, so that appearance and workability are deteriorated.

Glass Fiber Layer

The glass fiber layer serves to suppress deformation due to dimensional change of the floor decorative material.

The glass fiber layer is not particularly limited as long as the glass fiber layer contains glass fibers that can be used for a conventional floor decorative material, and for example, may be prepared by impregnating and then curing a glass fiber substrate with an impregnating composition containing a polyvinyl chloride resin.

The impregnating composition may further include a material that may be used for a glass fiber impregnating layer of a conventional floor decorative material, and may further include, for example, a plasticizer, a thixotropic agent, a filler, and the like.

In this case, the glass fiber substrate is not particularly limited as long as the glass fiber substrate is a glass fiber substrate applicable to a conventional floor decorative material, but may be, for example, a basis weight of 30 to 100 g/m$^2$, or 40 to 60 g/m$^2$.

In addition, the glass fiber layer may have an average thickness of 0.1 to 1.0 mm, or 0.2 to 0.8 mm. When the average thickness of the glass fiber layer is less than the above range, there may be a problem that the thickness of the glass fiber layer is thin, so that the dimensional stability effect of the floor decorative material is insufficient. When the average thickness thereof exceeds the above range, there may be a problem that the thickness of the glass fiber layer is too thick, so that economic feasibility is lowered and appearance and workability are deteriorated.

Second Middle Layer

The second middle layer serves to provide a noise prevention function, stability, dimensional stability, and a curling prevention function to the floor decorative material.

The second middle layer is not particularly limited as long as the second middle layer is a middle layer that can be used for a conventional floor decorative material, and may include, for example, a polyethylene resin, a polypropylene resin, an ABS resin, a polyvinyl chloride resin, an acrylic resin, a polyester resin, a polystyrene resin, polytetrafluoroethylene, an ethylene vinyl acetate copolymer, an ethylene propylene copolymer, and the like.

In addition, the second middle layer may have an average thickness of 0.2 to 1 mm, or 0.4 to 0.8 mm. When the average thickness of the second middle layer is less than the above range, there may be a problem that noise prevention, dimensional stability and mechanical properties of the prepared floor decorative material are deteriorated. When the average thickness thereof exceeds the above range, there may be a problem that the thickness of the prepared floor decorative material becomes thick, so that economical efficiency is deteriorated and appearance and workability are lowered.

Printing Layer

The printing layer serves to impart a visual effect to the floor decorative material.

The printing layer is not particularly limited as long as the printing layer is a printing layer that can be used for a conventional floor decorative material, and may be formed by a method such as gravure printing or transfer printing.

In addition, the printing layer may have an average thickness of 0.05 to 0.5 mm, or 0.08 to 0.3 mm. When the average thickness of the printing layer is less than the above range, there may be a problem that the thickness of the printing layer is too thin and thus, the hiding force of the floor decorative material is lowered, so that the color of the second middle layer is visible. When the average thickness thereof exceeds the above range, there may be a problem that the thickness of the printing layer is too thick, and thus, the color of the printed pattern is darkened, so that economic feasibility is lowered.

Transparent Layer

The transparent layer has excellent durability to protect the printing layer and serves to provide a three-dimensional effect.

The transparent layer is not particularly limited as long as the transparent layer is a transparent layer that can be used for a conventional floor decorative material, and may include, for example, a polyethylene resin, a polypropylene resin, an ABS resin, a polyvinyl chloride resin, an acrylic resin, a polyester resin, a polystyrene resin, polytetrafluoroethylene, an ethylene vinyl acetate copolymer, an ethylene propylene copolymer, and the like.

In addition, the transparent layer may have an average thickness of 0.1 to 1.0 mm, or 0.3 to 0.7 mm. When the average thickness of the transparent layer is less than the above range, there may be a problem that the durability of the prepared floor decorative material is insufficient, and when the average thickness thereof exceeds the above range, there may be a problem that the appearance characteristics of the prepared floor decorative material are reduced and economic feasibility is deteriorated.

Surface Treatment Layer

The surface treatment layer serves to impart physical properties such as fouling resistance and scratch resistance of the surface of the floor decorative material.

The surface treatment layer is not particularly limited as long as the surface treatment layer can be applied to a conventional floor decorative material, and for example, may be prepared from a composition containing an ultraviolet curable resin such as an acrylate-based resin.

In addition, the surface treatment layer may have an average thickness of 2 to 30 μm, or 5 to 20 μm. When the average thickness of the surface treatment layer is less than the above range, there may be a problem that the thickness of the surface treatment layer is thin, so that the scratch resistance and fouling resistance effects of the floor decorative material are insufficient. When the average thickness thereof exceeds the above range, there may be a problem that the thickness of the surface treatment layer is too thick, so that the three-dimensional effect and appearance characteristics of the floor decorative material are deteriorated, and the economic feasibility is lowered.

The multilayer floor decorative material may have a total volatile organic compound (TVOC) emission amount of 0.1 mg/m$^2$·hr or less or 0.01 to 0.08 mg/m$^2$·hr, and an average thickness of 1 to 10 mm, or 3 to 7 mm.

The multilayer floor decorative material may have an impact absorption rate of 7% or more, 8% or more, or 8 to 15%, measured according to a method of KS M 3888-1, and have an amount of light impact sound reduction of 10 db or more, 12 db or more, or 12 to 20 db, measured according to a method of KS F 2865.

The multilayer floor decorative material according to the present invention is prepared by a mechanical foaming method without using a chemical foaming agent, so that there is a small difference in thickness between tile pieces. In addition, the multilayer floor decorative material has an excellent impact absorption rate, includes regulated phthalates in an amount of less than 0.1 wt % with respect to the total weight of the foam layer, and is eco-friendly due to little emission of volatile organic compounds (VOCs).

Modes for the Invention

Hereinafter, the present invention will be described in more detail through Examples. However, these Examples are just to help in the understanding of the present invention and the scope of the present invention is not limited to these Examples in any meaning.

Example 1. Preparation of Multilayer Floor Decorative Material 1-1: Preparation of Foam Layer 47 parts by weight of a polyvinyl chloride resin (degree of polymerization: 1700, weight average molecular weight: 220,000 g/mol), 41 parts by weight of dioctyl terephthalate as a plasticizer, 9 parts by weight of calcium carbonate (white powder with an average diameter of 10 μm) as a filler, 1 part by weight of a mixture of barium stearate and zinc stearate in a weight ratio of 1:2 as a heat-resistant stabilizer, and 2 parts by weight of BYK 8020 of Byk Chemie as a foam stabilizer were mixed and mechanically foamed to prepare a foam layer composition having a foaming magnitude of 200%. Thereafter, the foam layer composition was gelled in a 170° C. gelling drum to form a foam layer having an average thickness of 0.8 mm.

1-2: Multilayer Floor Decoration Material

A multilayer floor decorative material of the same form as in FIG. 1 was prepared, and each layer was prepared by a calendaring method, but a glass fiber layer was prepared using an impregnation method, and the respective layers were prepared and then laminated. At this time, the thickness of each layer was shown in Table 2.

Specifically, each layer except for the glass fiber layer was mixed with the components and composition ratios shown in Table 1 below, and the mixed raw materials were heated and pressurized to be uniformly first gelled, and then second gelled using an extruder. In addition, the glass fiber layer was prepared by impregnating the glass fiber substrate having a basis weight of 50 g/m$^2$ in the impregnating composition in which the components in Table 1 were mixed in the composition ratio, and gelling in a gelling drum of 170° C.

At this time, the polyvinyl chloride resin had a polymerization degree of 1,000 and a weight average molecular weight of 130,000 g/mol, dioctyl terephthalate was used as a plasticizer, and calcium carbonate (white powder with an average diameter of 10 μm) was used as a filler. In addition, a mixture of barium stearate and zinc stearate in a weight ratio of 1:2 was used as the heat-resistant stabilizer. In addition, BTA-751U from Dow was used as an impact modifier, and TiO$_2$ was used as a pigment.

In addition, the surface treatment layer was formed by coating a urethane acrylate-based resin (manufacturer: POLYNETRON, product name: PN-3336) as a photocurable resin and curing the resin with ultraviolet rays.

TABLE 1

| Component (parts by weight) | Transparent layer | Printing layer | Second middle layer | Glass fiber layer | First middle layer | Balance layer |
|---|---|---|---|---|---|---|
| Polyvinyl chloride resin | 80 | 83 | 22 | 34 | 19 | 44 |
| Plasticizer | 18 | 8 | 10 | 23 | 9 | 10 |
| Filler | — | — | 67 | 40 | 70 | 44 |
| Heat-resistant stabilizer | 2 | 1 | 1 | 3 | 1 | 2 |
| Impact modifier | — | — | — | — | 1 | — |
| Pigment | — | 8 | — | — | — | — |

TABLE 2

| Classification (mm) | Surface treatment layer | Transparent layer | Printing layer | Second middle layer | Foam layer | Glass fiber layer | First middle layer | Balance layer | Total thickness |
|---|---|---|---|---|---|---|---|---|---|
| Example 1 | 0.01 | 0.5 | 0.09 | 0.6 | 0.8 | 0.3 | 2.5 | 0.2 | 5.0 |

Examples 2 to 8 and Comparative Examples 1 to 4

The multilayer floor decorative material was prepared in the same manner as in Example 1, except that the composition of the foam layer was adjusted as described in Table 3.

TABLE 3

| Component (parts by weight) | Polyvinyl chloride resin | Plasticizer | Filler | Heat-resistant stabilizer | Foam stabilizer | Total amount |
|---|---|---|---|---|---|---|
| Example 1 | 47 | 41 | 9 | 1 | 2 | 100 |
| Example 2 | 42 | 40 | 10 | 1 | 7 | 100 |
| Example 3 | 48 | 41 | 9 | 1 | 1 | 100 |
| Example 4 | 42 | 37 | 10 | 1 | 10 | 100 |
| Example 5 | 43 | 41 | 9 | 5 | 2 | 100 |
| Example 6 | 43 | 38 | 9 | 7 | 3 | 100 |
| Example 7 | 46 | 41 | 9.9 | 0.1 | 3 | 100 |
| Example 8 | 43 | 37 | 9 | 8 | 3 | 100 |
| Example 9 | 47 | 41 | 9 | 1 | 2 | 100 |
| Example 10 | 47 | 41 | 9 | 1 | 2 | 100 |
| Example 11 | 47 | 41 | 9 | 1 | 2 | 100 |
| Example 12 | 47 | 41 | 9 | 1 | 2 | 100 |
| Example 13 | 47 | 41 | 9 | 1 | 2 | 100 |
| Example 14 | 47 | 41 | 9 | 1 | 2 | 100 |
| Comparative Example 1 | 47 | 42.5 | 9 | 1 | 0.5 | 100 |
| Comparative Example 2 | 42 | 37 | 8 | 1 | 12 | 100 |
| Comparative Example 3 | 47 | 43 | 9 | 1 | — | 100 |
| Comparative Example 4 | 47 | 41 | 9 | — | 3 | 100 |

Example 9

A floor decorative material was prepared in the same manner as in Example 1, except for using 1 part by weight of a mixture obtained by mixing barium stearate and zinc stearate in a weight ratio of 1:2.5 as a heat-resistant stabilizer.

Example 10

A floor decorative material was prepared in the same manner as in Example 1, except for using 1 part by weight of a mixture obtained by mixing barium stearate and zinc stearate in a weight ratio of 1:3 as a heat-resistant stabilizer.

Example 11

A floor decorative material was prepared in the same manner as in Example 1, except for using 1 part by weight of a mixture obtained by mixing barium stearate and zinc stearate in a weight ratio of 1:3.5 as a heat-resistant stabilizer.

Example 12

A floor decorative material was prepared in the same manner as in Example 1, except for using 1 part by weight of a mixture obtained by mixing barium stearate and zinc stearate in a weight ratio of 1:1.5 as a heat-resistant stabilizer.

11 12

Example 13

A floor decorative material was prepared in the same manner as in Example 1, except for using 1 part by weight of a mixture obtained by mixing barium stearate and zinc stearate in a weight ratio of 1:1 as a heat-resistant stabilizer.

Example 14

A floor decorative material was prepared in the same manner as in Example 1, except for using 1 part by weight of a mixture obtained by mixing barium stearate and zinc stearate in a weight ratio of 1:0.5 as a heat-resistant stabilizer.

Comparative Example 5

A floor decorative material was prepared in the same manner as in Example 1, except for using a chemical foaming layer as the foaming layer.

At this time, the chemical foaming layer was prepared and used by chemically foaming a composition consisting of 100 parts by weight of a polyvinyl chloride resin (polymerization degree: 1,000, weight average molecular weight: 100,000 g/mol), 60 parts by weight of dioctyl terephthalate, 40 parts by weight of calcium carbonate (white powder having an average diameter of 10 μm), 3 parts by weight of azodicarbonamide (ADCA) as a foaming agent, and 1 part by weight of zinc oxide (ZnO) as a foaming accelerator at 205° C. to have an average thickness of 0.8 mm.

Comparative Example 6

A floor decorative material was prepared in the same manner as in Example 1, except for using a non-foam layer having an average thickness of 0.8 mm instead of the foam layer.

Specifically, 47 parts by weight of a polyvinyl chloride resin (degree of polymerization: 1700, weight average molecular weight: 220,000 g/mol), 41 parts by weight of dioctyl terephthalate as a plasticizer, 9 parts by weight of calcium carbonate (white powder with an average diameter of 10 μm) as a filler, and 1 part by weight of a mixture of barium stearate and zinc stearate in a weight ratio of 1:2 as a heat-resistant stabilizer were mixed to prepare a non-foam composition. Thereafter, the non-foam composition was gelled in a 170° C. gelling drum to form a non-foam layer having an average thickness of 0.8 mm.

Comparative Example 7

A floor decorative material was prepared in the same manner as in Example 1, except for using 1 part by weight of barium stearate as the heat-resistant stabilizer.

Comparative Example 8

A floor decorative material was prepared in the same manner as in Example 1, except for using 1 part by weight of zinc stearate as the heat-resistant stabilizer.

Experimental Examples: Evaluation of Characteristics of Floor Decorative Material The floor decorative materials of Examples and Comparative Examples were measured in the following methods and the results were shown in Table 4.

(1) Impact Absorption Rate

The impact absorption rate was measured for a floor decorative material according to a method of KS M 3888-1.

(2) TVOC Emission Amount

The TVOC emission amount was measured for a floor decorative material according to a method of KS I ISO 16000-9.

(3) Thickness Tolerance

After a total of 100 samples were taken, thicknesses were measured to obtain an average thickness, the largest difference value (maximum deviation value) was calculated based on the average thickness, and then a thickness tolerance was calculated by (average thickness–maximum deviation value)/average thickness X 100.

(4) Amount of Light Impact Sound Reduction

The amount of light impact sound reduction was measured according to a method of KS F 2865.

TABLE 4

| | Impact absorption rate (%) | TVOC emission amount (mg/m² · hr) | Thickness tolerance (%) | Amount of light impact sound reduction (dB) |
|---|---|---|---|---|
| Example 1 | 11 | 0.05 | 4 | 16 |
| Example 2 | 11 | 0.05 | 4 | 16 |
| Example 3 | 9 | 0.05 | 5 | 15 |
| Example 4 | 9 | 0.05 | 5 | 16 |
| Example 5 | 11 | 0.05 | 4 | 16 |
| Example 6 | 8 | 0.05 | 6 | 16 |
| Example 7 | 7 | 0.05 | 7 | 13 |
| Example 8 | 7 | 0.05 | 6 | 14 |
| Example 9 | 11 | 0.05 | 4 | 16 |
| Example 10 | 10 | 0.05 | 4 | 15 |
| Example 11 | 8 | 0.05 | 6 | 13 |
| Example 12 | 11 | 0.05 | 4 | 16 |
| Example 13 | 10 | 0.05 | 4 | 15 |
| Example 14 | 8 | 0.05 | 6 | 13 |
| Comparative Example 1 | 5 | 0.05 | 9 | 10 |
| Comparative Example 2 | 4 | 0.05 | 10 | 9 |
| Comparative Example 3 | 3 | 0.05 | 12 | 7 |
| Comparative Example 4 | 2 | 0.05 | 12 | 8 |
| Comparative Example 5 | 8 | 0.2 | 13 | 15 |
| Comparative Example 6 | 2 | 0.05 | 5 | 9 |
| Comparative Example 7 | 3 | 0.05 | 14 | 7 |
| Comparative Example 8 | 2 | 0.05 | 15 | 7 |

As shown in Table 4, the multilayer floor decorative materials of Examples 1 to 14 were excellent in impact absorption rate and eco-friendly due to a low TVOC emission amount without containing a regulated phthalate plasticizer, and had a small thickness tolerance and an excellent amount of light impact sound reduction.

On the other hand, the floor decorative materials of Comparative Example 1 including a small amount of foam stabilizer in the foam layer and Comparative Example 2 including an excessive amount of foam stabilizer had an insufficient impact absorption rate, a large thickness tolerance, and an insufficient amount of light impact sound reduction. In addition, the floor decorative materials of Comparative Example 3 without containing the foam stabilizer in the foam layer and Comparative Example 4 without containing the heat-resistant stabilizer had an insufficient impact absorption rate, a large thickness tolerance, and an insufficient amount of light impact sound reduction. In addition, the floor decorative material of Comparative Example 5 including the chemical foam layer had a large thickness tolerance, and was insufficient for eco-friendliness due to a large amount of TVOC emission. In addition, Comparative Example 6 including the non-foam layer was insufficient in the impact absorption rate and the amount of light impact sound reduction. In addition, Comparative Example 7 containing only barium stearate and Comparative Example 8 containing only zinc stearate as the heat-resistant stabilizer had an insufficient impact absorption rate, a large thickness tolerance, and an insufficient amount of light impact sound reduction.

The invention claimed is:

1. A multilayer floor decorative material comprising a foam layer, wherein
the foam layer comprises a polyvinyl chloride resin, a plasticizer, a filler, a heat-resistant stabilizer, and a foam stabilizer,
the foam layer is formed by a mechanical foaming method,
the heat-resistant stabilizer comprises barium stearate and zinc stearate at a weight ratio of 1:1 to 3,
the foam stabilizer is included in an amount of 1 to 10 parts by weight based on 35 to 55 parts by weight of the polyvinyl chloride resin,
the foam layer comprises 35 to 55 parts by weight of the polyvinyl chloride resin, 30 to 50 parts by weight of the plasticizer, 1 to 20 parts by weight of the filler, and 0.5 to 7 parts by weight of the heat-resistant stabilizer,
the foam layer comprises a regulated phthalate in an amount of less than 0.1 wt % with respect to a total weight of the foam layer, and
a foaming magnitude of the foam layer is from 150 to 350%.

2. The multilayer floor decorative material of claim 1, wherein the polyvinyl chloride resin has a polymerization degree of 1,000 to 2,000, and a weight average molecular weight (Mw) of 130,000 to 250,000 g/mol.

3. The multilayer floor decorative material of claim 1, wherein the plasticizer comprises one or more selected from the group consisting of dioctyl terephthalate (DOTP), 1,2-cyclohexane dicarboxylic acid diisononyl ester (DINCH) and dipropylheptylphthalate (DPHP).

4. The multilayer floor decorative material of claim 1, wherein the filler comprises at least one selected from the group consisting of calcium carbonate, titanium dioxide, alumina, aluminum oxide, and silica.

5. The multilayer floor decorative material of claim 1, wherein an average diameter of the filler is from 1 to 50 μm.

6. A multilayer floor decorative material comprising a foam layer,
wherein the foam layer comprises a polyvinyl chloride resin, a plasticizer, a filler, a heat-resistant stabilizer, and a foam stabilizer,
the foam layer is formed by a mechanical foaming method,
the heat-resistant stabilizer comprises barium stearate and zinc stearate at a weight ratio of 1:1 to 3,
the foam stabilizer is included in an amount of 1 to 10 parts by weight based on 35 to 55 parts by weight of the polyvinyl chloride resin,
the foam layer comprises 35 to 55 parts by weight of the polyvinyl chloride resin, 30 to 50 parts by weight of the plasticizer, 1 to 20 parts by weight of the filler, and 0.5 to 7 parts by weight of the heat-resistant stabilizer,

the foam layer comprises a regulated phthalate in an amount of less than 0.1 wt % with respect to a total weight of the foam layer, and
an average thickness of the foam layer is from 0.5 to 2.0 mm.

7. The multilayer floor decorative material of claim 1, wherein the foam layer is not foamed by a chemical foaming method.

8. The multilayer floor decorative material of claim 1, wherein the regulated phthalate comprises at least one selected from the group consisting of di-2-ethylhexyl phthalate (DEHP), di-isononyl phthalate (DINP), butyl benzyl phthalate (BBP), di-isodecyl phthalate (DIDP), di-n-octyl phthalate (DNOP), and di-butyl phthalate (DBP).

9. The multilayer floor decorative material of claim 1, further comprising a balance layer, a first middle layer, a glass fiber layer, a second middle layer, a printing layer, a transparent layer, and a surface treatment layer.

10. The multilayer floor decorative material of claim 1, wherein an average thickness of the foam layer is from 0.5 to 2.0 mm.

11. The multilayer floor decorative material of claim 6, wherein the polyvinyl chloride resin has a polymerization degree of 1,000 to 2,000, and a weight average molecular weight (Mw) of 130,000 to 250,000 g/mol.

12. The multilayer floor decorative material of claim 6, wherein the plasticizer comprises one or more selected from the group consisting of dioctyl terephthalate (DOTP), 1,2-cyclohexane dicarboxylic acid diisononyl ester (DINCH) and dipropylheptylphthalate (DPHP).

13. The multilayer floor decorative material of claim 6, wherein the filler comprises at least one selected from the group consisting of calcium carbonate, titanium dioxide, alumina, aluminum oxide, and silica.

14. The multilayer floor decorative material of claim 6, wherein an average diameter of the filler is from 1 to 50 μm.

15. The multilayer floor decorative material of claim 6, wherein a foaming magnitude of the foam layer is from 150 to 350%.

16. The multilayer floor decorative material of claim 6, wherein the foam layer is not foamed by a chemical foaming method.

17. The multilayer floor decorative material of claim 6, wherein the regulated phthalate comprises at least one selected from the group consisting of di-2-ethylhexyl phthalate (DEHP), di-isononyl phthalate (DINP), butyl benzyl phthalate (BBP), di-isodecyl phthalate (DIDP), di-n-octyl phthalate (DNOP), and di-butyl phthalate (DBP).

18. The multilayer floor decorative material of claim 6, further comprising a balance layer, a first middle layer, a glass fiber layer, a second middle layer, a printing layer, a transparent layer, and a surface treatment layer.

19. A multilayer floor decorative material comprising a foam layer, a balance layer, a first middle layer, a glass fiber layer, a second middle layer, a printing layer, a transparent layer, a balance layer, a first middle layer, a glass fiber layer, a second middle layer, a printing layer, a transparent layer, and a surface treatment layer, wherein
the foam layer comprises a polyvinyl chloride resin, a plasticizer, a filler, a heat-resistant stabilizer, and a foam stabilizer,
the foam layer is formed by a mechanical foaming method,
the heat-resistant stabilizer comprises barium stearate and zinc stearate at a weight ratio of 1:1 to 3, the foam stabilizer is included in an amount of 1 to 10 parts by weight based on 35 to 55 parts by weight of the polyvinyl chloride resin, the foam layer comprises 35 to 55 parts by weight of the polyvinyl chloride resin, 30 to 50 parts by weight of the plasticizer, 1 to 20 parts by weight of the filler, and 0.5 to 7 parts by weight of the heat-resistant stabilizer, and the foam layer comprises a regulated phthalate in an amount of less than 0.1 wt % with respect to a total weight of the foam layer.

\* \* \* \* \*